US009374834B2

(12) United States Patent
Kneckt et al.

(10) Patent No.: US 9,374,834 B2
(45) Date of Patent: Jun. 21, 2016

(54) TECHNIQUES FOR RTS/CTS USAGE FOR WIRELESS NETWORKS

(75) Inventors: Jarkko Kneckt, Espoo (FI); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1521 days.

(21) Appl. No.: 11/956,909

(22) Filed: Dec. 14, 2007

(65) Prior Publication Data

US 2008/0144586 A1    Jun. 19, 2008

Related U.S. Application Data

(60) Provisional application No. 60/870,707, filed on Dec. 19, 2006.

(51) Int. Cl.
*H04W 74/02* (2009.01)
*H04W 74/00* (2009.01)
*H04W 24/00* (2009.01)

(52) U.S. Cl.
CPC ............ *H04W 74/002* (2013.01); *H04W 24/00* (2013.01)

(58) Field of Classification Search
USPC .......................................... 370/322, 323, 332
See application file for complete search history.

(56) References Cited

U.S. PATENT DOCUMENTS

| | | | |
|---|---|---|---|
| 2004/0028003 A1* | 2/2004 | Diener .................. | H04L 1/0001 370/319 |
| 2005/0141476 A1 | 6/2005 | Choi et al. | |
| 2006/0262765 A1* | 11/2006 | Peleg .................... | H04W 28/24 370/338 |

FOREIGN PATENT DOCUMENTS

| | | |
|---|---|---|
| GB | 2414637 | 11/2005 |
| WO | 2008075177 A2 | 6/2008 |
| WO | 2008075177 A3 | 6/2008 |

OTHER PUBLICATIONS

Godfrey, Tim "Inside 802.11e: Making QoS a Reality over WLAN Connections", http://www.commsdesign.com/showArticle.jhtml?articleID=17000388, (Dec. 19, 2003).
Yu, James "IEEE 802.11e QoS QoS for Wireless LAN: A Research Direction", TDC Network Seminar, (Dec. 9, 2003).
Laner, "IEEE 802.11: A Fast Reassociation Procedure in the Point Coordination Function", NTU CSIE, Cellular Group, online, (2002), 1-74.

(Continued)

*Primary Examiner* — Sulaiman Nooristany
(74) *Attorney, Agent, or Firm* — Alston & Bird LLP (57) ABSTRACT

Various embodiments are disclosed relating to techniques for RTS/CTS usage in a wireless network. According to an example embodiment, a network performance may be measured within a wireless network. A variety of parameters may be measured at a wireless node to determine a network performance. In addition, it may be determined whether the network performance has reached a degraded performance threshold. A frame is transmitted via the wireless network. If the network performance has reached the degraded performance threshold, the frame may be transmitted using a Request-to-Send/Clear-to-Send (RTS/CTS) protection. In another example embodiment, a frame may be transmitted using RTS/CTS protection if an estimated transmission time for the frame exceeds a transmission time threshold.

18 Claims, 5 Drawing Sheets

(56) References Cited

OTHER PUBLICATIONS

"IEEE 802.22n/D1.0; Draft Amendment to Standard fro Information Technology—Telecommunications and Information Excange Between Systems—Local and Metropolitan Networks—Specific Requirements:", Part 11: Wireless Lan Medium Access Control (MAC) and Physical Layer (PHY) Specifications: Enhancements for Higher Throughput; IEEE P802.11n/D1.0 Mar. 2006, 1-335.

Office Action for Korean Patent Application No. 10-2008-7005043 (with English Translataion), mailed on Mar. 23, 2010, 10 pages.

Weinmiller, J. et al., "Analyzing the RTS/CTS mechanism in the DFWMAC media access protocol for wireless LANs", IFIP TC6 worshop Personal wireless comm., (1995).

Binh, N. et al., "Avoiding bottlenecks due to traffic aggregation at relay nodes in multi- hop wireless networks", Communications, 2005 Asia-Pacific conference, (2005), pp. 769-773.

International Search Report and Written Opinion for PCT/IB2007/003949 dated Jun. 10, 2008.

"IEEE 802.11: A Fast Reassociation Procedure in the Point Coordination Function"; Laner, 2002 online, pp. 1-74.

"IEEE 802.11: A Fast Reassociation Procedure in the Point Coordination Funciton" Laner, 2002 online, pp. 1-74.

* cited by examiner

TECHNIQUES FOR RTS/CTS USAGE FOR WIRELESS NETWORKS

CROSS REFERENCE TO RELATED APPLICATIONS

This application claims the benefit under 35 U.S.C. §119(e) of U.S. Provisional Patent Application Ser. No. 60/870,707, filed on Dec. 19, 2006. The entire disclosure of U.S. Provisional Application 60/870,707 is incorporated by reference herein in its entirety.

BACKGROUND

The rapid diffusion of Wireless Local Area Network (WLAN) access and the increasing demand for WLAN coverage is driving the installation of a very large number of Access Points (AP). The most common WLAN technology is described in the Institute of Electrical and Electronics Engineers IEEE 802.11 family of industry specifications, such as specifications for IEEE 802.11b, IEEE 802.11g and IEEE 802.11a. Other wireless technologies are being developed, such as IEEE 802.16 or WiMAX technology. A number of different 802.11 task groups are involved in developing specifications relating to improvements to the existing 802.11 technology. A draft specification from the IEEE 802.11e Task Group has proposed a set of QoS parameters to be used for traffic between an Access Point and a station. See, e.g., Tim Godfrey, "Inside 802.11e: Making QoS A Reality Over WLAN Connections," CommsDesign, Dec. 19, 2003. These are a few examples of wireless network specifications or proposed standards, and there are many other wireless technologies and standards being developed.

A number of wireless standards allow stations to access a channel through a contention based channel access mechanism, where wireless nodes may contend for channel access (or access to the wireless medium). For example, in WiMedia Distributed MAC specification, this channel access technique is referred to as prioritized contention access (PCA), where contention access is provided using different access categories (ACs), or traffic priorities. For example, for WiMedia and for 802.11e Enhanced Data Channel Access (EDCA), different quality of service (QoS) parameters may be provided for each AC. For example, QoS parameters may include: CWmin [AC], which is the minimum contention window for the AC, the CWmax[AC], the AIFSN[AC] which is the arbitration inter-frame spacing for the AC, the TXOPLimit[AC] which defines the length of the transmission opportunity or TXOP a wireless node is granted. Values for these parameters may be established to favor higher ACs or over lower ACs, for example.

In some wireless networks (such as 802.11 Wireless LAN networks as an example), virtual carrier-sense and physical carrier-sense functions may be used to determine the availability of the shared medium or channel. For example, the medium may be considered to be idle in some cases when both of these two functions indicate that the medium is idle. While the physical carrier-sense function uses the physical layer to sense the carrier, the virtual carrier-sense function is based on the Network Allocation Vector (NAV). For example, most IEEE 802.11 frames may carry a duration field, which may be used to reserve the medium (or channel) for a fixed time period. The NAV may be considered a timer that indicates the amount of time for which the medium has been reserved. Transmitting nodes may typically set the NAV (using the duration field in frames) to the time for which they expect to use the medium, including the transmission time of all the frames in a sequence. Other nodes in the network may set up a process to count down the NAV (a locally stored copy of the NAV information). When the NAV is greater than zero, the virtual carrier-sense function indicates that the medium is busy. When the NAV reaches zero, the medium is reported to be idle.

In addition, wireless nodes may use a Request-to-Send (RTS) and Clear-to-Send (CTS) exchange to request permission or clearance to use the medium or channel. A requesting node may typically send a RTS, and then receive a CTS. The CTS may indicate that the channel or medium is idle or available and may serve to warn other nodes that the medium is now busy, since the RTS and CTS frames also typically include a duration field. The use of RTS/CTS may provide increased protection for a frame since a RTS/CTS exchange may decrease the likelihood of a collision with another frame. The NAV mechanism and/or the RTS/CTS exchange may be used in wireless networks to reduce frame collisions and to reduce "hidden node" problems.

To limit overhead, RTS/CTS protection is typically used only for frames that exceed a size threshold. This is a fairly simple approach, and there may be other factors or criteria that may be useful in determining when to use the RTS/CTS protection.

SUMMARY

Various embodiments are disclosed relating to wireless networks, and also relating to techniques for RTS/CTS usage for wireless networks.

According to an example embodiment, a network performance may be measured within a wireless network. A variety of parameters may be measured at a wireless node to determine a network performance. In addition, it may be determined whether the network performance has reached a degraded performance threshold. A frame is transmitted via the wireless network. If the network performance has reached the degraded performance threshold, then the frame is transmitted using a Request-to-Send/Clear-to-Send (RTS/CTS) protection.

According to another example embodiment, an apparatus may be provided in a wireless node. The apparatus may be configured to: measure a network performance within a wireless network, determine whether the network performance has reached a degraded performance threshold, and transmit a frame via the wireless network. The frame may be transmitted using a Request-to-Send/Clear-to-Send (RTS/CTS) protection if the network performance has reached the degraded performance threshold.

According to another example embodiment, a transmission time for a frame may be estimated (or determined). A number of different techniques may be used to estimate a frame transmission time. In an example embodiment, a transmission time for a frame may be estimated or calculated based on the frame size and the transmission rate. Also, it may be determined whether the estimated transmission time for the frame exceeds a transmission time threshold. The frame is then transmitted via a wireless network. The frame may be transmitted using a Request-to-Send/Clear-to-Send (RTS/CTS) protection if the estimated transmission time for the frame exceeds the transmission time threshold.

According to another example embodiment, a network performance may be measured within a wireless network. It is determined whether the network performance has reached a degraded performance threshold. A transmission time for a frame may be estimated (or determined). It may be determined whether the estimated transmission time for the frame exceeds a transmission time threshold. In addition, the frame may be transmitted via the wireless network. The frame may be transmitted using a Request-to-Send/Clear-to-Send (RTS/CTS) protection if: the network performance has reached the degraded performance threshold, and the estimated transmission time for the frame exceeds the transmission time threshold.

In yet another example embodiment, an apparatus may be provided in a wireless node. The apparatus may be configured to: measure a network performance within a wireless network, determine whether the network performance has reached a degraded performance threshold, estimate a transmission time for a frame, determine whether the estimated transmission time for the frame exceeds a transmission time threshold, and transmit the frame via the wireless network. The frame may be transmitted using a Request-to-Send/Clear-to-Send (RTS/CTS) protection if the network performance has reached the degraded performance threshold and the estimated transmission time for the frame exceeds the transmission time threshold.

The details of one or more implementations are set forth in the accompanying drawings and the description below. Other features will be apparent from the description and drawings.

DETAILED DESCRIPTION

Figure 1:
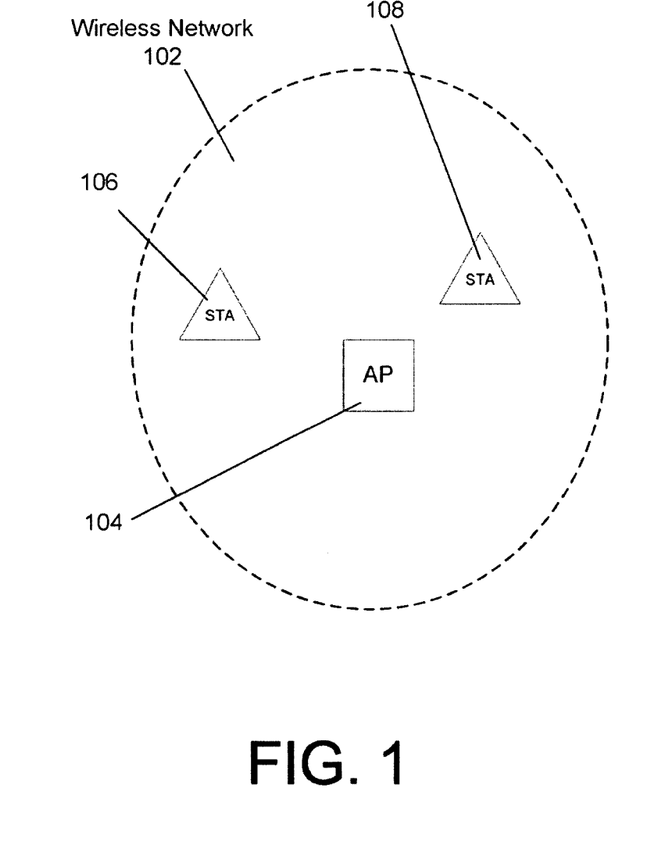
FIG. 1 is a block diagram illustrating a wireless network according to an example embodiment.

Referring to the Figures in which like numerals indicate like elements, FIG. 1 is a block diagram illustrating a wireless network 102 according to an example embodiment. Wireless network 102 may include a number of wireless nodes or stations, such as an access point (AP) 104 or base station and one or more mobile stations or subscriber stations, such as stations 106 and 108. While only one AP and two mobile stations are shown in wireless network 102, any number of APs and stations may be provided. Each station in network 102 (e.g., stations 106, 108) may be in wireless communication with the AP 104, and may even be in direct communication with each other. Although not shown, AP 104 may be coupled to a fixed network, such as a Local Area Network (LAN), Wide Area Network (WAN), the Internet, etc., and may also be coupled to other wireless networks.

The various embodiments described herein may be applicable to a wide variety of networks and technologies, such as WLAN networks (e.g., IEEE 802.11 type networks), IEEE 802.16 WiMAX networks, WiMedia networks, Ultra Wide Band networks, cellular networks, radio networks, or other wireless networks. In another example embodiment, the various examples and embodiments may be applied, for example, to a mesh wireless network, where a plurality of mesh points (e.g., Access Points) may be coupled together via wired or wireless links. The various embodiments described herein may be applied to wireless networks, both in an infrastructure mode where an AP or base station may communicate with a station (e.g., communication occurs through APs), as well as an ad-hoc mode in which wireless stations may communicate directly via a peer-to-peer network, for example.

The term "wireless node" or "node," or the like, may include, for example, a wireless station, such as a mobile station or subscriber station, an access point (AP) or base station, a relay station, a wireless personal digital assistant (PDA), a cell phone, an 802.11 WLAN phone, a WiMedia device, a WiMAX device, a wireless mesh point, or any other wireless device. These are merely a few examples of the wireless devices and technologies that may be used to implement the various embodiments described herein, and this disclosure is not limited thereto.

Wireless nodes may use a Request-to-Send (RTS) and Clear-to-Send (CTS) exchange to request permission or clearance to use the medium or channel. A requesting node may typically send a RTS, and then receive a CTS, which may indicate that the channel or medium is idle or available and may serve to warn other nodes that the medium is now busy. The RTS and CTS frames may also include a duration field, and thus, may reserve the medium using the NAV. The use of RTS/CTS may provide increased protection for a frame since a RTS/CTS exchange may decrease the likelihood of a collision with another frame. Transmitting a frame using a RTS/CTS exchange (e.g., send a RTS, receive a CTS, and then transmit the protected frame) may, therefore, be referred to as transmitting a frame using a Request-to-Send/Clear-to-Send (RTS/CTS) protection.

To limit the overhead, RTS/CTS protection is typically used only for frames that exceed a size threshold. However, this may result in either an under-use or over-use of the RTS/CTS protection, at least in some cases. According to an example embodiment, a number of other parameters or factors (in addition to or instead of frame size) may also be used to determine when to use RTS/CTS protection for a frame transmission. The various parameters or factors for determining when to use RTS/CTS may include, for example, an estimated transmission time for a frame, a measured network performance (e.g., as measured by a node within a wireless network), and other parameters or factors, for example.

According to an example embodiment, wireless nodes may typically transmit at a number of different data transmission rates, which may range from 1 Mbps up to 54 Mbps or more. This is merely an example, and various standards and specifications are providing for even higher transmission rates. For example, wireless nodes often perform rate scaling, or adjusting the transmission rate, e.g., based on a link or signal quality. According to an example, a probability (or likelihood) of a frame collision may vary based on transmission time for a frame, e.g., with a likelihood of a frame collision increasing as the transmission time increases, although other factors may be used as well. Transmission of a frame at a low transmission rate may occupy the medium for a relatively long period of time, and transmission of the same frame at a much higher rate may occupy the medium for a much shorter period of time. Thus, a likelihood of collision, e.g., which may be based on a transmission time in this example, may be significantly less for the higher transmission rate, for example. Thus, according to an example embodiment, RTS/CTS protection may be used for frames having an estimated transmission time greater than a transmission time threshold. Otherwise, according to this example embodiment, if the frame has an estimated transmission time less than a transmission time threshold, the frame may be transmitted without RTS/CTS protection (e.g., without first transmitting a RTS and then receiving a CTS). In an example embodiment, a transmission time for a frame may be estimated or calculated based on the frame size and the transmission rate, such as:

(estimated)transmission time=(frame size)/(transmission rate).

The frame size may include for example, a single frame, or an aggregated frame (which may include multiple frames). The frame size may include, for example, a MAC (Media Access Control) Protocol Data Unit (MPDU), or may include a Physical layer Protocol Data Unit (PPDU), as examples.

In another example embodiment, RTS/CTS protection may be used for a frame if the frame size exceeds a size threshold. This criteria or condition, for example, may also be combined with other conditions. Similarly, in an example embodiment, the condition relating to transmission time duration exceeding a transmission time threshold may also be combined with one or more other conditions or criteria as part of determining when to use RTS/CTS protection for a frame.

In addition, one or more other conditions or parameters may be evaluated to determine whether a frame collision is likely to occur. Or, in another example embodiment, a RTS/CTS exchange may be particularly useful where transmission problems may result from frame collisions or traffic congestion, and not due to other problems (such as a weak signal strength, or too high of a data rate, etc.). For example, if the wireless node is the only node in a wireless network (other than an AP), then a RTS/CTS exchange may not offer protection, but may increase delay and overhead. Thus, one or more other conditions or parameters may be evaluated to determine whether RTS/CTS protection should be used for a frame.

According to an example embodiment, network performance at a node may be evaluated to determine whether RTS/CTS protection should be used for transmitting a frame. The network performance may be measured by a node, and may reflect the network performance as measured or detected at that node, and does not, necessarily, reflect an overall network performance measurement. According to an example embodiment, a RTS/CTS protection for transmitting a frame may be used if a measured (or detected) network performance reaches a degraded performance threshold. For example, RTS/CTS protection may be used for a frame if the network performance has suffered or decreased, and has reached (such as less than or greater than, depending on the type of threshold) a degraded performance threshold.

A variety of network performance parameters or criteria may be measured, and then used to make a decision on whether or not to use RTS/CTS exchange (RTS/CTS protection) for a frame. For example, a wireless node may measure a number or percentage of frame retransmissions from the wireless node. The number (or percentage) of retransmissions may indicate a frame transmission failure rate, since a frame may often be retransmitted where the node did not receive an acknowledgement (ACK) within a timeout or received a negative acknowledgement (NACK), for example. For example, RTS/CTS may be used where retransmission rate for the node exceeds X % over the last N frames, where X and N may be set to any number (e.g., RTS/CTS may be used where retransmission rate for the node exceeds 25% over the last 10 frames). Or in another example, RTS/CTS may be used where a percentage of successful frame transmissions from the wireless node is less than 75% over the last 15 frames, for example. These are some examples, and other numbers may be used.

Also, in another example embodiment, network performance may be measured as a number or percentage of successful first frame transmissions from the wireless node for a transmission opportunity TXOP. Thus, first frame transmissions may refer to the first frame transmitted by a node within a TXOP (e.g., in a case where more than one node could share a TXOP), or the first transmitted frame of the TXOP. The first transmitted data frame is typically sent at a full (or higher data rate), while the acknowledgement (ACK) to the frame may be sent at a lower data rate (e.g., 1 or 2 Mbps for example). The ACK to the first frame may, for example, include a duration field, which may operate to reserve the medium using the NAV. Thus, in some cases, having a successful first frame of a TXOP may be a good indicator of transmission success for the node, for example.

As another example parameter, network performance may be measured as a channel load for the wireless medium. Channel load (or simply load) may be determined using a variety of different parameters and measurement techniques. Channel load may refer to, for example, the number of active (e.g., associated) wireless nodes in a network, or the amount of traffic in a network, or the amount of bandwidth that is occupied or used in a network, or other measurement of load. For example, a number of stations or nodes in a network may be broadcast by an AP within a Beacon, e.g., within a QBSS Load parameter, as part of IEEE 802.11e. Also, a node may obtain the channel load, such as number of associated nodes, from the AP during the process of associating or in an Association reply from the AP. Or, the wireless node may simply listen (e.g., receive and evaluate transmitted frames) to traffic transmitted over the network to determine the amount of traffic or the approximate number of other nodes, etc. Other techniques may be used to determine a load for the channel or medium.

In another example embodiment, a channel load measurement, or other network performance measurement, may consider signals or distortions received from other wireless networks (e.g., ad hoc and/or infrastructure networks). A wireless node may listen to a media, such as when obtaining a TXOP for a frame. When sensing the media, the wireless node may obtain or receive source addresses or other identifiers that identify various transmitting nodes in this network or other networks that may be nearby or in the neighborhood (e.g., neighbor networks). For example, a wireless node may measure channel load based on the number of nodes that are transmitting within a certain period of time, e.g., from a group of wireless networks. Similarly, beacon transmissions from this wireless network and other (e.g., neighbor) networks may be received or monitored to determine a channel or media load.

In another example embodiment, network performance may be measured as the delay period from a time of frame transmission of a frame from the wireless node until an acknowledgement is received by the node, for one or more frame transmissions. This delay period may be referred to as an ACK delay. This ACK delay may be an average ACK delay over N last transmitted frames, for example. A lower amount of congestion in the network may typically result in a lower ACK delay, at least in some cases.

In an example embodiment, a node replying to a received frame may send an ACK or may send a PPDU which may include an aggregated block ACK and data MPDUs at a high data transmission rate (or at least a rate above the low or minimum rate used for most ACKs/NAKs). In such a case, the ACK delay may be measured, for example, as the time between the frame transmission and receipt of an ACK at a low transmission rate (which may not necessarily be receipt of the PPDU with aggregate block ACK). This is an example, and other periods may be measured as the ACK delay.

There are many other ways in which network performance may be measured, e.g., ways in which it may be determined that the network is performing poorly from the perspective of the node. In addition, network performance may be measured as one or more of these above-described parameters, or a combination of these parameters, or other network performance parameters. These are some example network performance parameters that may be measured to determine whether the network is performing poorly, e.g., performance that reaches a degraded performance threshold where RTS/CTS protection may be used. Other network performance parameters may be used, such as, e.g., received signal strength, bit error rate, packet error rate, or other channel quality measurements or error measurement techniques, etc.

The network performance parameter may be compared to a degraded performance threshold, and if the measured network performance reaches the degraded performance threshold, then RTC/CTS protection may be used, or may be used for frames greater than size X, or may be used for frames having a transmission time greater than Y, as examples. For example, RTS/CTS protection may be used where a rate (or percentage) of successful first frame transmissions is less than 50%. In this example, the degraded performance threshold may be a 50% rate of success for first frame transmissions, as an example.

Also, a Boolean combination of multiple parameters may be used to measure network performance, and compare it to one or more thresholds to determine whether or not RTC/CTS protection should be provided for the next frame, or next group of frames, etc. For example, RTS/CTS may be used where the rate (or percentage) of successful first frame transmissions for the node for the last N first frames is less than 60%, and the current frame to be transmitted has an estimated transmission time greater than 0.25 ms. This is merely an example, and other parameters (or combinations of parameters) and thresholds may be used.

A number of wireless standards may allow stations to access a channel through a contention based channel access mechanism, where wireless nodes may contend for channel access. For example, in the WiMedia Distributed MAC specification, this channel access technique is referred to as prioritized contention access (PCA), where contention access is provided using different access categories (ACs), or traffic priorities (or traffic classes). For example, for WiMedia and for 802.11e Enhanced Data Channel Access (EDCA), different quality of service (QoS) parameters may be provided for each AC. For example, QoS parameters may include: CWmin [AC], which is the minimum contention window for the AC, the CWmax[AC], the AIFSN[AC] which is the arbitration inter-frame spacing for the AC, the TXOPLimit[AC] which defines the length of the transmission opportunity or TXOP a wireless node is granted. Values for these parameters may be established to favor higher ACs over lower ACs, for example.

According to an example embodiment, one or more of the various network performance parameters may be measured on a per-AC (or per access category) basis (or for each AC), and the various thresholds (e.g., various degraded performance thresholds and/or transmission time thresholds) may be applied on a per-AC basis (or for each AC). In this manner, a decision may be made to use RTS/CTS for each AC based on AC-specific parameters and thresholds, for example.

In an example embodiment, a transmission time threshold may be set for each AC (transmission time thresholds that are AC-specific). For example, a same transmission time threshold may be used for each (or one or more ACs), or a different transmission time threshold may be used for each AC. For example, lower transmission time thresholds may be used for higher ACs (or for higher priority traffic classes), such that higher AC (or higher priority) traffic may be permitted easier access to RTS/CTS protection, for example. Thus, for example, by using AC-specific transmission time thresholds, RTS/CTS protection may be provided to smaller frames, or to frames having a smaller estimated transmission time, as examples, for higher ACs (or higher priority traffic), e.g., by setting lower transmission time thresholds for high ACs (or for high priority traffic), thereby to favor high AC traffic, as an example.

Also, according to an example embodiment, one or more network performance parameters may be measured for each AC (AC-specific measured network performance parameters). Thus, for example, a number or percentage of frame retransmissions, a number or percentage of successful frame transmissions (frame transmission success rate), a success rate for first frame transmissions, a channel load, an ACK delay period (e.g., time from a frame transmission to receipt of an ACK), and other network performance parameters may be measured for specific access categories (ACs) or traffic priorities or traffic classes. Each frame, for example, may indicate its access category, or the transmitting node may of course know the AC for the frame, and may generate or measure these various network performance parameters for each AC, for example. For example, depending on how the QoS parameters are set for the different ACs, the measured network performance may be different for each AC.

Similarly, according to an example embodiment, a degraded performance threshold may be set for each access category, e.g., AC-specific degraded performance thresholds. For example, a degraded performance threshold may be set for AC=3 (or high priority traffic) where RTS/CTS protection would be provided where a rate of successful first frame transmission for the last N first frames is less than 60%, whereas a threshold success rate of 50% may be used for lower ACs (or lower priority traffic). This may make it more likely that RTS/CTS protection may be used on higher AC (or higher priority) traffic.

The following describes an example where different degraded performance thresholds (60% vs. 50%) and transmission time thresholds (0.25 ms vs. 0.35 ms) may be applied to different ACs, e.g., to favor higher AC or higher priority traffic, as an example.

1) High priority traffic (e.g., AC=2, 3):
   a. example degraded performance threshold→first frame transmission success rate threshold=60%;
   b. transmission time threshold=0.25 ms
2) Low priority traffic (e.g., AC=0, 1):
   a. example degraded performance threshold→first frame transmission success rate threshold=50%;
   b. transmission time threshold=0.35 ms Thus, in this example, RTS/CTS exchange (RTS/CTS protection) will be used at this node for frames having high priority (e.g., AC=2 or 3) if the first frame transmission success rate is less than 60% for high AC frames having an estimated transmission time of 0.25 ms or more. RTS/CTS exchange (RTS/CTS protection) will be used at this node for frames having low priority (e.g., AC=0 or 1) if the first frame transmission success rate is less than 50% for low AC frames having an estimated transmission time of 0.35 ms or more. This is merely an example, and a wide variety of parameters and thresholds may be used.

According to an example embodiment, the measured network performance (e.g., as measured at a wireless node) may also be compared to a second performance threshold, referred to as a worse degraded performance threshold. In an example embodiment, the worse degraded performance threshold may indicate an even worse network performance than the degraded performance threshold. If the measured network performance reaches the worse degraded performance threshold, then the transmission time threshold (or a frame size threshold) may be decreased to allow RTS/CTS protection to be used for smaller frames or for frames having a smaller estimated transmission time. This may allow RTS/CTS protection to be made more available to protect smaller frames when performance becomes even worse, or worse than this second threshold, which may trigger the adjustment of the transmission time duration.

For example, in the example above, RTS/CTS exchange (RTS/CTS protection) will be used at this node for high priority (e.g., AC=2 or 3) frames having if the first frame transmission success rate (for high priority frames) is less than 60% and for frames having an estimated transmission time of 0.25 ms or more. However, a worse degraded performance threshold may be set at a first frame transmission success rate of 40%. Thus, as measured at the node (for example), if high priority frames have a first frame transmission success rate of 38% (or other number less than 40%), then the transmission time threshold may be decreased at the node from 0.25 ms to 0.15 ms, for example, to allow smaller (e.g., at the same data rate) high priority frames greater access to RTS/CTS protection.

Figure 2:
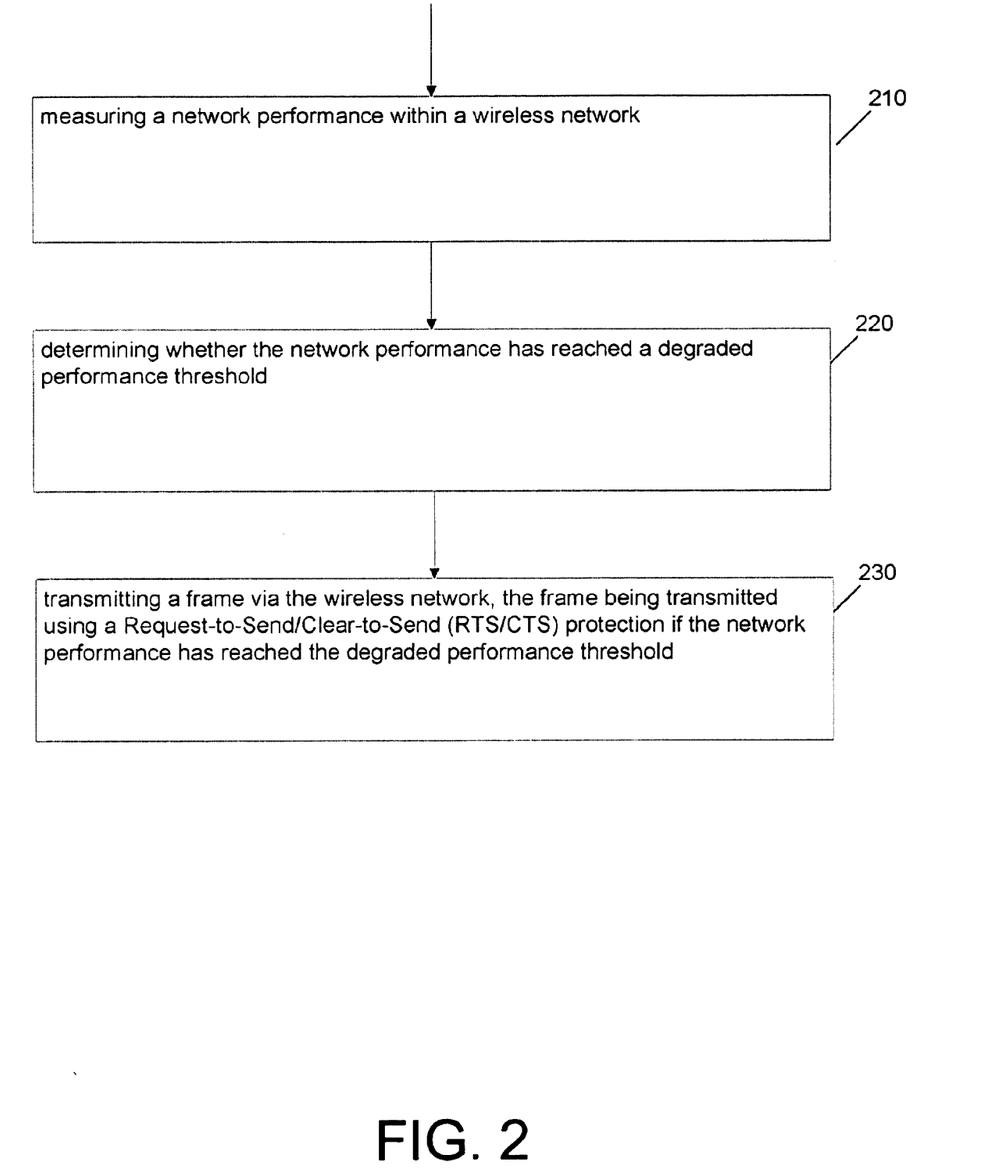
FIG. 2 is a flowchart illustrating operation of a wireless node according to an example embodiment.

FIG. 2 is a flowchart illustrating operation of a wireless node according to an example embodiment. At 210, a network performance may be measured within a wireless network. A variety of parameters, e.g., as measured at a wireless node, may be used to measure network performance. For example, a number or percentage of frame retransmissions, a number or percentage of successful frame transmissions (frame transmission success rate), a success rate for first frame transmissions, a channel load, an ACK delay period (e.g., time from a frame transmission to receipt of an ACK), and other network performance parameters may be measured and used as an indication of network performance, as experienced by the node. In an example embodiment, the network performance parameters may be measured for specific access categories (ACs) or traffic priorities, for example.

At 220, it is determined whether the network performance has reached a degraded performance threshold. This may be done by comparing the network performance to the degraded performance threshold. For example, a degraded performance threshold may be used as: a first frame transmission success rate threshold=60%. Thus, in this example, at operation 220, it is determined whether the measured first frame transmission success rate at this node is less than 60%. This is merely an example, and other numbers and parameters may be used.

At operation 230, a frame is transmitted via the wireless network. If the network performance has reached the degraded performance threshold, then the frame is transmitted using a Request-to-Send/Clear-to-Send (RTS/CTS) protection (e.g., by sending a RTS, receiving a CTS, and then transmitting the frame). For example, if the first frame transmission success rate is less than 60% (the degraded performance threshold in this example), then the frame is transmitted using RTS/CTS protection. Otherwise, the frame is typically transmitted without RTS/CTS protection, for example.

Figure 3:
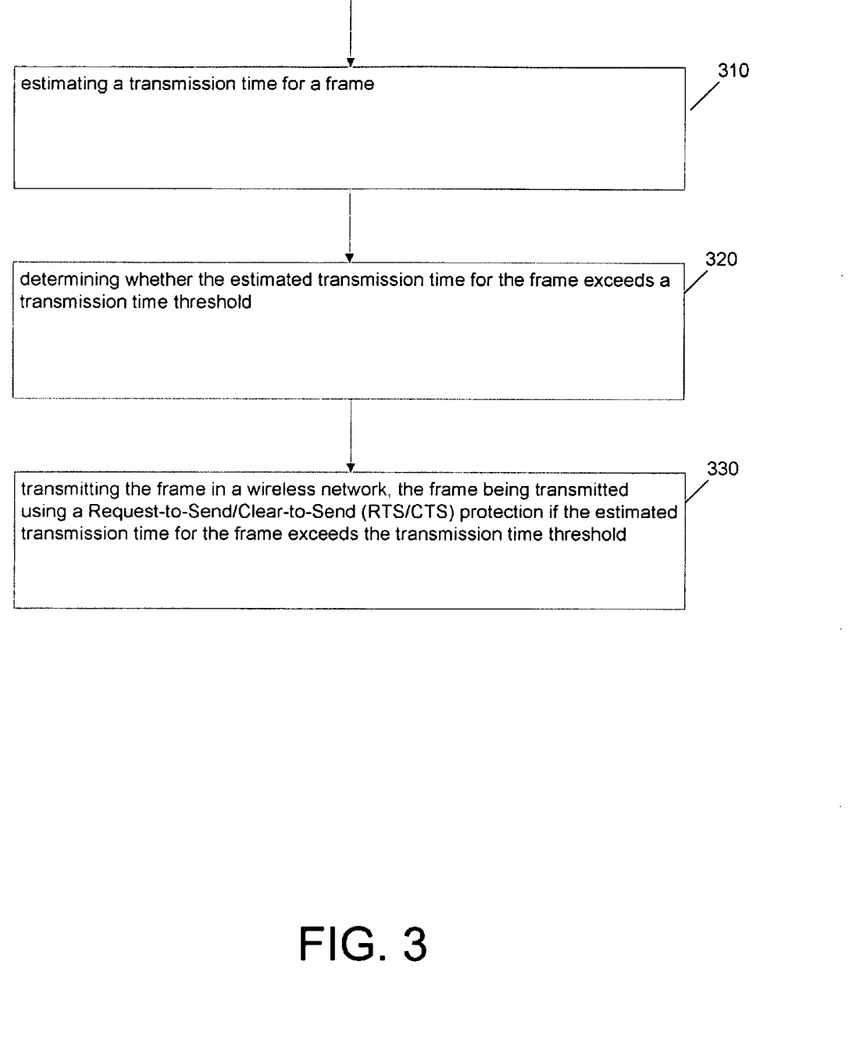
FIG. 3 is a flowchart illustrating operation of a wireless node according to another example embodiment.

FIG. 3 is a flowchart illustrating operation of a wireless node according to another example embodiment. At 310, a transmission time for a frame is estimated (or determined). A number of different techniques may be used to estimate a frame transmission time. In an example embodiment, a transmission time for a frame may be estimated or calculated based on the frame size and the transmission rate, such as: (esti-mated) transmission time=(frame size)/(transmission rate). AC-specific transmission time thresholds may also be used.

At 320, it may be determined whether the estimated transmission time for the frame exceeds a transmission time threshold. For example, at 320, a wireless node may determine whether the estimated transmission time for a frame exceeds a transmission time threshold of 0.35 ms.

At 330, the frame is transmitted in a wireless network. The frame is transmitted using a Request-to-Send/Clear-to-Send (RTS/CTS) protection if the estimated transmission time for the frame exceeds the transmission time threshold. Otherwise, for example, the frame may be transmitted without RTS/CTS protection. Use of this transmission time threshold may allow greater use or greater access to RTS/CTS protection for frames that have a larger transmission time. The estimated transmission time, in some example embodiments, may take into account (or be based upon) factors such as the frame size and the data transmission rate for the frame.

Figure 4:
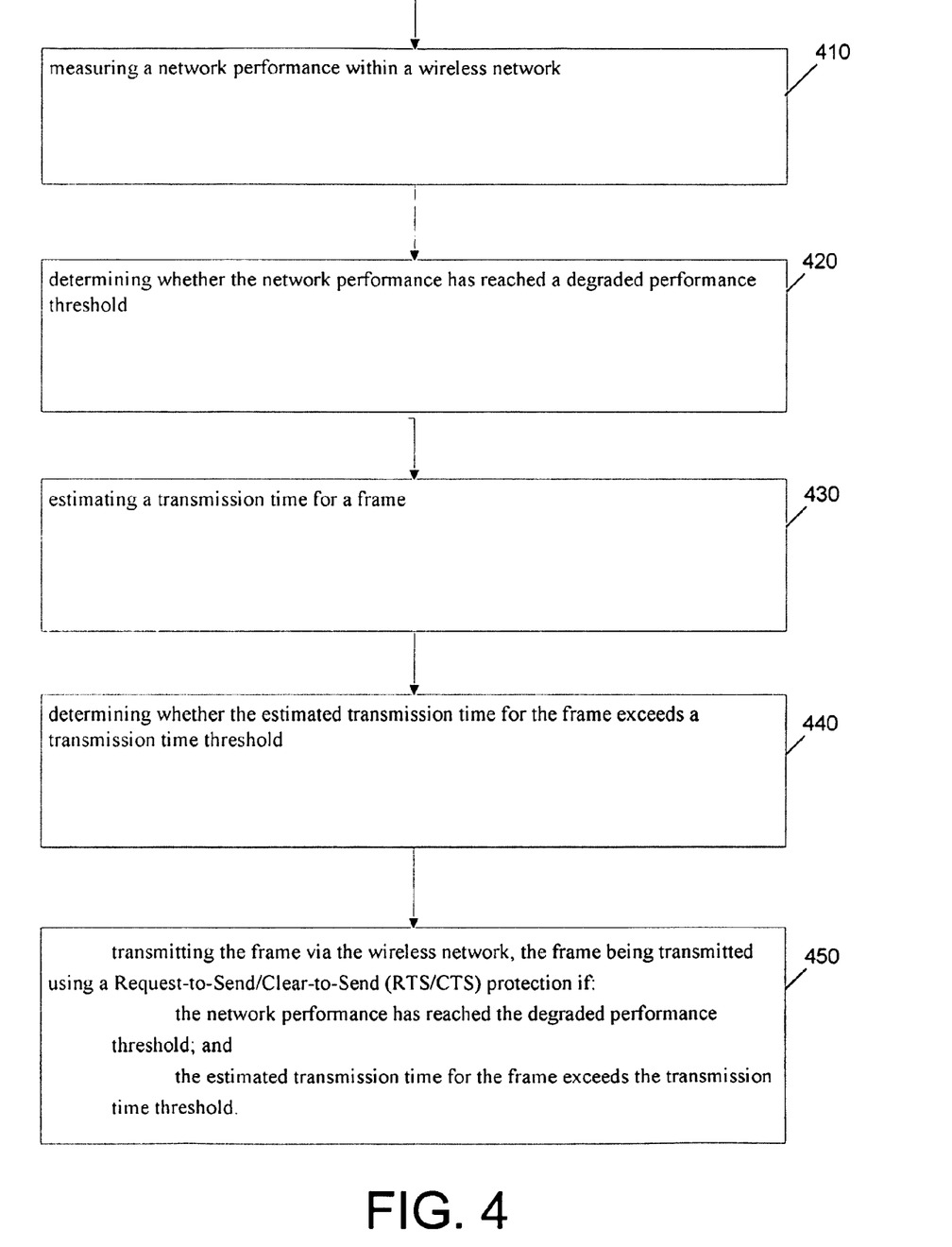
FIG. 4 is a flowchart illustrating operation of a wireless node according to yet another example embodiment.

FIG. 4 is a flowchart illustrating operation of a wireless node according to yet another example embodiment. At 410, a network performance may be measured within a wireless network. A variety of parameters, e.g., as measured at a wireless node, may be used to measure network performance. For example, a number or percentage of frame retransmissions, a number or percentage of successful frame transmissions (frame success rate), a success rate for first frame transmissions, a channel load, an ACK delay period (e.g., time from a frame transmission to receipt of an ACK), and/or other network performance parameters may be measured. In an example embodiment, the network performance parameters may be measured for specific access categories (ACs) or traffic priorities, for example.

At 420, it is determined whether the network performance has reached a degraded performance threshold. This may be done by comparing the network performance to the degraded performance threshold. For example, a degraded performance threshold may be used as: a first frame transmission success rate threshold=60%. Thus, in this example, it is determined whether the measured first frame transmission success rate at this node is less than 60%, for example. This is merely an example, and other numbers and parameters may be used.

At 430, a transmission time for a frame is estimated (or determined). A number of different techniques may be used to estimate a frame transmission time. In an example embodiment, a transmission time for a frame may be estimated or calculated based on the frame size and the transmission rate, such as:

(estimated) transmission time=(frame size)/(transmission rate). AC-specific transmission time thresholds may also be used.

At 440, it may be determined whether the estimated transmission time for the frame exceeds a transmission time threshold. For example, at 440, a wireless node may determine whether the estimated transmission time for a frame exceeds a transmission time threshold of 0.35 ms.

At 450, the frame may be transmitted via the wireless network. The frame may be transmitted using a Request-to-Send/Clear-to-Send (RTS/CTS) protection if:
  a. the network performance has reached the degraded performance threshold; and
  b. the estimated transmission time for the frame exceeds the transmission time threshold.

Otherwise, if conditions a) and b) are not met, then the frame may be transmitted without RTS/CTS protection, according to this example embodiment.

In an illustrative example, at 450, the frame may be transmitted using RTS/CTS protection if:

a. the first frame transmission success rate is less than 60% (the degraded performance threshold in this example is reached); and b. the estimated transmission time for the frame is greater than 0.35 ms (the transmission time threshold in this example is exceeded).

Referring to FIG. 4, according to another example embodiment, the measured network performance (e.g., as measured at a wireless node) may also be compared to a worse degraded performance threshold. If the measured network performance reaches the worse degraded performance threshold, then the transmission time threshold (or a frame size threshold) may be decreased to allow RTS/CTS protection to be used for smaller frames or for frames having a smaller estimated transmission time. This may allow RTS/CTS protection to be made more available to protect smaller frames when performance becomes even worse, or worse than this second threshold, which may trigger the adjustment of the transmission time duration or frame size threshold. For example, a worse degraded performance threshold may be set at a first frame transmission success rate of 40%. Thus, as measured at the node (for example), if high priority frames have a first frame transmission success rate of 38% (or other number less than 40%), then the transmission time threshold may be decreased at the node from 0.25 ms to 0.15 ms, for example, to allow smaller high priority frames greater access to RTS/CTS protection. Or, a transmission size threshold may be decreased, to allow smaller frames to obtain RTS/CTS protection.

According to an example embodiment, one or more degraded performance thresholds may be stored at the wireless node, e.g., as Management Information Base (MIB) parameters. A user, or an AP/BS, or the wireless node may update the values of these MIB parameters, select a different algorithm or technique for making a determination of when to use RTS/CTS protection for frames at the node. The following are some descriptions of some example MIB parameters that may be used at a wireless node for a transmission time threshold and degraded performance thresholds.

1) dot11RTSTimeThresholdAC[4] OBJECT-TYPE SYNTAX INTEGER (0.65535) MAX-ACCESS read-write. This attribute may indicate a duration in multiples of 4 microseconds of the first transmitted PPDU (or frame) before a receiver transmits acknowledgement or block acknowledgement or aggregated data+acknowledgement frame to it, below which an RTS/CTS handshake should not be performed (according to this example embodiment). An RTS/CTS handshake should be performed at the beginning of any frame exchange sequence where the PPDU (or frame) is of type Data, aggregated data or Management, the PPDU transmitted to an individual address in the Address1 field, and the duration (or estimated transmission time) of the MPDU is greater than this threshold.

Setting this attribute to be longer than the maximum TXOPLimit (or maximum TXOP size) may typically have the effect of turning off the RTS/CTS handshake for frames of Data or Management type transmitted by this station or wireless node. Setting this attribute to zero may typically have the effect of turning on the RTS/CTS handshake for all frames of Data or Management type transmitted by this station or node. The default value of this attribute may be 4095, as an example.

2) dot11RTSFirstPPDUCollisionsAC[4] OBJECT-TYPE SYNTAX INTEGER (0 . . . 100) MAX-ACCESS read-write. This attribute may indicate the percentage of the first frame or all aggregated frames that did not receive an acknowledgement. The amount of the considered first frame transmissions is specified in the dot11RTSPPDUBufferSize MIB variable. If the percentage of first frame transmission errors exceeds this attribute, then the RTS/CTS protection (or exchange) should be used (according to this example embodiment). This attribute may be used as a degraded performance threshold. The dot11RTSPPDUBufferSize can be set to same value as used buffer in triggered QoS measurements.

3) dot11RTSChannelLoadThresholdAC[4] OBJECT-TYPE SYNTAX INTEGER (0 . . . 100) MAX-ACCESS read-write. This attribute may indicate in percentages of time when other stations or nodes allocate (or occupy) the medium or channel for data transmission. The channel use may be recognized or noticed from CCA or from NAV having a non zero value. For example, a node may use RTS/CTS protection when another node's channel utilization is larger than the value specified in this attribute. Default value may be 40, as an example. All of these example MIB parameters may be AC-specific.

The aggregated frames size may also be controlled with a parameter that takes into account the used transmission rate, not only the aggregate size in bytes. In an example embodiment, an aggregate maximum size (for an aggregated frame) may be controlled with 2 variables (as an example), including the maximum size in bytes and aggregate maximum duration. The maximum size in bytes may use the default aggregate MIB variable that exists in IEEE 802.11n, for example. The maximum aggregate duration may be used to make sure that an aggregated frame can be transmitted in time, limited by TXOPLimit. Also the duration based aggregated frame size limitation can adjust itself if the transmission rate changes, so it does not require updating. The duration limitation may limit the maximum duration of the burst of the aggregated frames from a node or station. Burst may use A-MSDU (Aggregated MSDU), A-MPDU (aggregated MPDU) or A-PPDU aggregation mechanisms. A burst is transmitted by a single terminal, so that delays between PPDUs are equal or less than SIFS (short interframe space) duration, according to an example embodiment.

4) dot11AggregationTimeThresholdAC[4] OBJECT-TYPE SYNTAX INTEGER (0 . . . 65535) MAX-ACCESS read-write. This attribute may indicate the duration in multiples of 4 microseconds for the maximum duration of the burst of aggregated PPDUs or a PPDU that is transmitted by the station or node. The burst may be transmitted by a single terminal, so that delays between PPDUs are typically equal or less than a SIFS duration, for example. This attribute or parameter may be used as a transmission time threshold.

Figure 5:
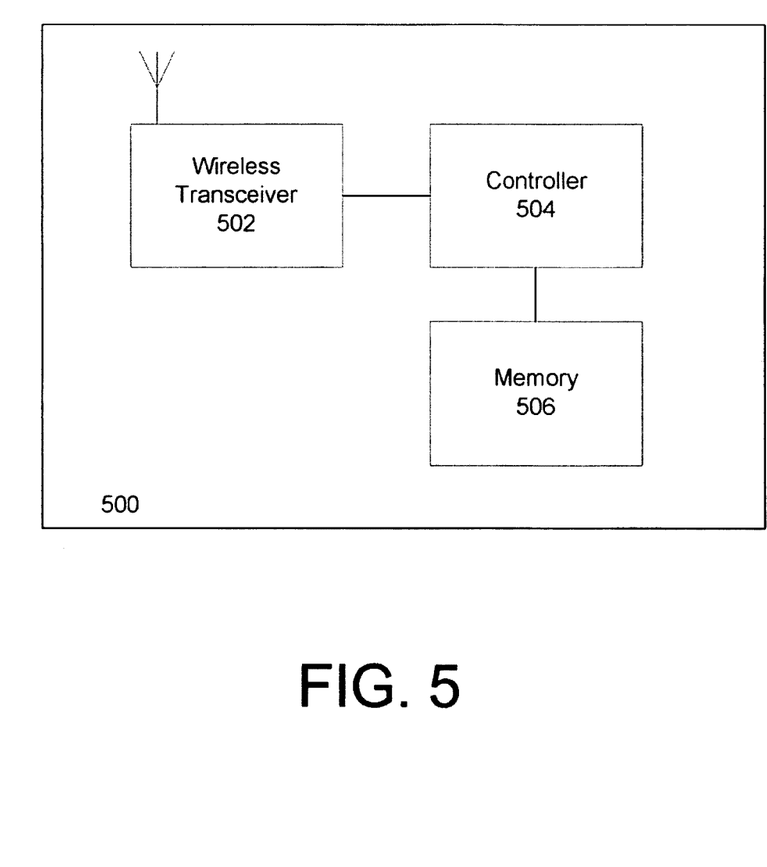
FIG. 5 is a block diagram illustrating an apparatus that may be provided in a wireless node according to an example embodiment.

FIG. 5 is a block diagram illustrating an apparatus 500 that may be provided in a wireless node according to an example embodiment. The wireless node (e.g. station or AP) may include, for example, a wireless transceiver 502 to transmit and receive signals, a controller 504 to control operation of the station and execute instructions or software, and a memory 506 to store data and/or instructions.

Controller 504 may be programmable and capable of executing software or other instructions stored in memory or on other computer media to perform the various tasks and functions described above, such as one or more the tasks or methods described above in FIGS. 1-4.

In addition, a storage medium may be provided that includes stored instructions, when executed by a controller or processor that may result in the controller 504, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art.

The invention claimed is:

1. A method comprising:
obtaining multiple network performance parameters for each of a plurality of access categories of the wireless network, wherein the plurality of access categories comprise at least one lower priority wireless network and at least higher priority wireless network;
measuring a network performance within a wireless network by measuring, at a wireless node within one access category of the wireless network, multiple network performance parameters, combinations of the multiple network performance parameters being associated with one or more degraded performance thresholds, wherein the measurement reflects the network performance as detected at the wireless node;
determining whether a combination of multiple measured network performance parameters has reached one or more degraded performance thresholds;
in response to determining that the combination of multiple measured network performance parameters has reached one or more degraded performance thresholds, transmitting a frame via the wireless network, the frame being transmitted using a Request-to-Send/Clear-to-Send (RTS/CTS) protection;
determining whether a combination of multiple measured network performance parameters has reached one or more further degraded performance thresholds; and
in response to determining that the combination of multiple measured network performance parameters has reached one or more further degraded performance thresholds, transmitting a second frame via the wireless network, the second frame being transmitted using the RTS/CTS protection, wherein a second frame size is different than a first frame size.

2. The method of claim 1, wherein the multiple network performance parameters comprise more than one of:
a number or percentage of frame retransmissions from the wireless node;
a number or percentage of successful frame transmissions from the wireless node;
a number or percentage of successful first frame transmissions from the wireless node, the first frame transmissions being respective first frames transmitted by the wireless node for respective transmission opportunities (TXOPs);
a channel load or a number of wireless nodes active in the network; and
a delay period from a time of frame transmission from the wireless node to a time of receiving an acknowledgement for one or more transmissions.

3. The method of claim 1, wherein the determining comprises comparing the combination of multiple measured network performance parameters to one or more thresholds.

4. The method of claim 1, wherein transmitting the frame using RTS/CTS protection comprises:
transmitting a request-to-send (RTS) message from the wireless node;
receiving, at the wireless node, in response to the transmitting of the RTS message, a clear-to-send (CTS) message; and
transmitting, from the wireless node, the frame in response to receiving the CTS message.

5. The method of claim 1, wherein:
the measuring comprises measuring multiple network performance parameters for an access category (AC) of the wireless network;
the determining comprises determining whether a combination of multiple network performance parameters for the AC has reached one or more degraded performance thresholds, the respective degraded performance thresholds being AC-specific degraded performance thresholds; and
the transmitting comprises transmitting a frame of the AC from the wireless node via the wireless network, the frame being transmitted using the RTS/CTS protection if the combination of multiple network performance parameters for the AC has reached one or more AC-specific degraded performance thresholds.

6. An apparatus provided in a wireless node comprising:
a controller; and
a memory including instructions, the instructions being executable by the controller and configured to cause the apparatus to:
obtain multiple network performance parameters for each of a plurality of access categories of the wireless network, wherein the plurality of access categories comprise at least one lower priority wireless network and at least higher priority wireless network;
measure a network performance within a wireless network by measuring, at a wireless node within one access category of the wireless network, multiple network performance parameters, combinations of the multiple network performance parameters being associated with one or more degraded performance threshold, wherein the measurement reflects the network performance as detected at the wireless node;
determine whether a combination of the multiple measured network performance parameters has reached one or more degraded performance thresholds;
in response to determining that the combination of multiple measured network performance parameters has reached one or more degraded performance thresholds, transmit a frame via the wireless network, the frame being transmitted using a Request-to-Send/Clear-to-Send (RTS/CTS) protection;
determine whether a combination of multiple measured network performance parameters has reached one or more further degraded performance thresholds; and in response to determining that the combination of multiple measured network performance parameters has reached one or more further degraded performance thresholds, transmit a second frame via the wireless network, the second frame being transmitted using the RTS/CTS protection, wherein a second frame size is different than a first frame size.

7. The apparatus of claim 6, wherein the apparatus comprises:
a controller;
a memory coupled to the controller; and
a wireless transceiver coupled to the controller.

8. The apparatus of claim 6, wherein the multiple network performance parameters are access category (AC)-specific, and the one or more degraded performance thresholds are AC-specific.

9. A method comprising:
obtaining multiple network performance parameters for each of a plurality of access categories of the wireless network, wherein the plurality of access categories comprise at least one lower priority wireless network and at least higher priority wireless network;
estimating a transmission time for a frame of an access category (AC) from the network performance parameters that were obtained, the AC corresponding with a quality of service in a wireless network;
determining whether the estimated transmission time for the frame exceeds a transmission time threshold, wherein the transmission time threshold is AC-specific;
transmitting the frame from a wireless node in the wireless network, the frame being transmitted using a Request-to-Send/Clear-to-Send (RTS/CTS) protection if the estimated transmission time for the frame exceeds the transmission time threshold
determining whether a combination of multiple measured network performance parameters has reached one or more further degraded performance thresholds; and
in response to determining that the combination of multiple measured network performance parameters has reached one or more further degraded performance thresholds, transmitting a second frame via the wireless network, the second frame being transmitted using the RTS/CTS protection, wherein a second frame size is different than a first frame size.

10. A method comprising:
obtaining multiple network performance parameters for each of a plurality of access categories of the wireless network, wherein the plurality of access categories comprise at least one low priority wireless network and at least high priority wireless network;
measuring a network performance within a wireless network by measuring, at a wireless node within one access category of the wireless network, multiple network performance parameters, combinations of the multiple network performance parameters being associated with one or more degraded performance thresholds, wherein the measurement reflects the network performance as detected at the wireless node;
determining whether a combination of the multiple measured network performance parameters has reached one or more degraded performance thresholds;
estimating a transmission time for a frame;
determining whether the estimated transmission time for the frame exceeds a transmission time threshold;
transmitting the frame via the wireless network using a Request-to-Send/Clear-to-Send (RTS/CTS) protection if:
the combination of the multiple measured network performance parameters has reached one or more degraded performance thresholds; and
the estimated transmission time for the frame exceeds the transmission time threshold
determining whether a combination of multiple measured network performance parameters has reached one or more further degraded performance thresholds; and
in response to determining that the combination of multiple measured network performance parameters has reached one or more further degraded performance thresholds, transmitting a second frame via the wireless network, the second frame being transmitted using the RTS/CTS protection, wherein a second frame size is different than a first frame size.

11. The method of claim 10, wherein the multiple network performance parameters comprise more than one of:
a number or percentage of frame retransmissions from the wireless node;
a number or percentage of successful frame transmissions from the wireless node;
a number or percentage of successful first frame transmissions from the wireless node,
the first frame transmissions being respective first frames transmitted by the wireless node for
respective transmission opportunities (TXOPs);
a channel load or a number of wireless nodes active in the network; and
a delay period from a time of frame transmission from the wireless node to a time of receiving an acknowledgement for one or more transmissions.

12. The method of claim 10, wherein the estimating comprises estimating a transmission time for the frame based on a size of the frame and a transmission rate for the frame.

13. The method of claim 10, wherein the multiple network performance parameters, the transmission time threshold, and the one or more degraded performance thresholds are access category (AC)-specific.

14. The method of claim 10, further comprising:
comparing the combination of the multiple network performance parameters to one or more worse degraded performance thresholds; and
decreasing the transmission time threshold if the combination of multiple network performance parameters reaches one or more worse degraded performance thresholds.

15. An apparatus provided in a wireless node, the apparatus configured to:
obtain multiple network performance parameters for each of a plurality of access categories of the wireless network, wherein the plurality of access categories comprise at least one lower priority wireless network and at least higher priority wireless network;
measure a network performance within a wireless network by measuring, at a wireless node within one access category of the wireless network, multiple network performance parameters, combinations of the multiple network performance parameters being associated with one or more degraded performance thresholds, wherein the measurement reflects the network performance as detected at the wireless node;
determine whether a combination of the multiple measured network performance parameters has reached one or more respective degraded performance thresholds;

estimate a transmission time for a frame;
determine whether the estimated transmission time for the frame exceeds a transmission time threshold;
transmit the frame via the wireless network using a Request-to-Send/Clear-to-Send (RTS/CTS) protection if:
the combination of the multiple measured network performance parameters has reached one or more degraded performance thresholds; and
the estimated transmission time for the frame exceeds the transmission time threshold
determine whether a combination of multiple measured network performance parameters has reached one or more further degraded performance thresholds; and
in response to determining that the combination of multiple measured network performance parameters has reached one or more further degraded performance thresholds, transmit a second frame via the wireless network, the second frame being transmitted using the RTS/CTS protection, wherein a second frame size is different than a first frame size.

16. The method of claim 15, wherein the apparatus is further configured to:
compare the multiple network performance parameters to one or more worse degraded performance thresholds; and
decrease the transmission time threshold if the combination of the multiple network performance parameters reaches one or more worse degraded performance thresholds.

17. The method of claim 1, further comprising:
determining whether a combination of multiple measured network performance parameters has reached one or more further degraded performance thresholds; and
in response to determining that the combination of multiple measured network performance parameters has reached one or more further degraded performance thresholds, trigger an adjustment of transmission time duration.

18. The apparatus of claim 6, wherein the memory includes instructions executable by the controller and configured to cause the apparatus to:
determine whether a combination of multiple measured network performance parameters has reached one or more further degraded performance thresholds; and
in response to determining that the combination of multiple measured network performance parameters has reached one or more further degraded performance thresholds, trigger an adjustment of transmission time duration.

* * * * *